(12) United States Patent
Zhen et al.

(10) Patent No.: US 11,430,094 B2
(45) Date of Patent: Aug. 30, 2022

(54) GUIDED MULTI-EXPOSURE IMAGE FUSION

(71) Applicant: Samsung Electronics Co., Ltd., Suwon-si (KR)

(72) Inventors: Ruiwen Zhen, Allen, TX (US); John Glotzbach, Allen, TX (US); Hamid Sheikh, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 52 days.

(21) Appl. No.: 17/103,850

(22) Filed: Nov. 24, 2020

(65) Prior Publication Data
US 2022/0020126 A1    Jan. 20, 2022

Related U.S. Application Data

(60) Provisional application No. 63/054,160, filed on Jul. 20, 2020.

(51) Int. Cl.
*G06T 5/00* (2006.01)
*G06T 5/50* (2006.01)
*G06T 5/20* (2006.01)

(52) U.S. Cl.
CPC .............. *G06T 5/009* (2013.01); *G06T 5/20* (2013.01); *G06T 5/50* (2013.01);
(Continued)

(58) Field of Classification Search
CPC .. G06T 5/009; G06T 5/20; G06T 5/50; G06T 2207/10024; G06T 2207/20208; G06T 2207/20221; G06T 2207/10144
See application file for complete search history.

(56) References Cited

U.S. PATENT DOCUMENTS

| 7,133,070 B2 | 11/2006 | Wheeler et al. |
| 7,428,378 B1 | 9/2008 | Warpakowski Furlan |

(Continued)

FOREIGN PATENT DOCUMENTS

| CN | 102665034 A | 9/2012 |
| CN | 103793885 B | 7/2016 |

(Continued)

OTHER PUBLICATIONS

International Search Report and Written Opinion of the International Searching Authority in connection with International Patent Application No. PCT/KR2021/004061 dated Jul. 9, 2021, 7 pages.

(Continued)

*Primary Examiner* — Phuoc Tran

(57) ABSTRACT

A method includes obtaining multiple images of a scene including a first image associated with a first exposure value and a second image associated with a second exposure value. Each image includes image data in each of multiple channels of a color space, and the first exposure value is greater than the second exposure value. The method also includes decomposing each channel of each image into a base layer and a detail layer. The method further includes generating for each image, a blending weight map for the base layer and a blending weight map for the detail layer. The method includes combining each base layer and each detail layer of each channel of each image based on the blending weight map for the base layer for the image and the blending weight map for the detail layer of the image to obtain an HDR image of the scene.

20 Claims, 7 Drawing Sheets

(52) U.S. Cl.
CPC .............. *G06T 2207/10024* (2013.01); *G06T 2207/20208* (2013.01); *G06T 2207/20221* (2013.01)

(56) References Cited

U.S. PATENT DOCUMENTS

| | | | |
|---|---|---|---|
| 7,443,443 | B2 | 10/2008 | Raskar et al. |
| 7,852,379 | B2 | 12/2010 | Aoki et al. |
| 7,962,030 | B2 | 6/2011 | Trevelyan |
| 8,018,525 | B2 | 9/2011 | Trevelyan et al. |
| 8,848,063 | B2 | 9/2014 | Jo et al. |
| 8,866,922 | B2 | 10/2014 | Tsubaki |
| 8,953,094 | B2 | 2/2015 | Baer |
| 8,989,484 | B2 | 3/2015 | Moon et al. |
| 9,024,951 | B2 | 5/2015 | Frank et al. |
| 9,081,257 | B2 | 7/2015 | Miyazaki |
| 9,240,038 | B2 | 1/2016 | Chen |
| 9,317,909 | B2 | 4/2016 | Kim |
| 9,330,446 | B2 | 5/2016 | Park |
| 9,438,809 | B2 | 9/2016 | Sheikh et al. |
| 9,456,144 | B2 | 9/2016 | Miyazaki |
| 9,571,745 | B2 | 2/2017 | Mahowald |
| 9,613,408 | B2 * | 4/2017 | Micovic ............... G06T 3/0068 |
| 10,097,765 | B2 | 10/2018 | Sheikh et al. |
| 10,165,194 | B1 | 12/2018 | Baldwin |
| 10,554,890 | B1 | 2/2020 | Le et al. |
| 2002/0113882 | A1 | 8/2002 | Pollard et al. |
| 2004/0100565 | A1 | 5/2004 | Chen et al. |
| 2004/0145674 | A1 | 7/2004 | Hoppe et al. |
| 2004/0234259 | A1 | 11/2004 | Muramatsu |
| 2006/0008171 | A1 | 1/2006 | Petschnigg et al. |
| 2006/0177150 | A1 | 8/2006 | Uyttendaele et al. |
| 2007/0025717 | A1 | 2/2007 | Raskar et al. |
| 2007/0025720 | A1 | 2/2007 | Raskar et al. |
| 2007/0146529 | A1 | 6/2007 | Suzuki |
| 2007/0201853 | A1 | 8/2007 | Petschnigg |
| 2007/0263099 | A1 | 11/2007 | Motta et al. |
| 2007/0264000 | A1 | 11/2007 | Hsieh et al. |
| 2008/0079842 | A1 | 4/2008 | Aoki et al. |
| 2008/0106636 | A1 | 5/2008 | Wernersson |
| 2008/0181597 | A1 | 7/2008 | Tamura |
| 2008/0192131 | A1 | 8/2008 | Kim et al. |
| 2008/0199172 | A1 | 8/2008 | Hamada |
| 2010/0066817 | A1 | 3/2010 | Zomet et al. |
| 2010/0165178 | A1 | 7/2010 | Chou et al. |
| 2010/0271512 | A1 | 10/2010 | Garten |
| 2010/0328486 | A1 | 12/2010 | Steinberg et al. |
| 2011/0157412 | A1 | 6/2011 | Yoshida |
| 2011/0188744 | A1 | 8/2011 | Sun |
| 2011/0254976 | A1 | 10/2011 | Garten |
| 2012/0050474 | A1 | 3/2012 | Segall |
| 2012/0218442 | A1 | 8/2012 | Jandhyala et al. |
| 2013/0100314 | A1 | 4/2013 | Li et al. |
| 2013/0278819 | A1 | 10/2013 | Liaw |
| 2013/0329015 | A1 | 12/2013 | Pulli et al. |
| 2014/0307044 | A1 | 10/2014 | Sharma et al. |
| 2015/0002704 | A1 | 1/2015 | Vidal-Naquet |
| 2015/0009355 | A1 | 1/2015 | Peng |
| 2015/0043811 | A1 | 2/2015 | Prabhudesai et al. |
| 2015/0062382 | A1 | 3/2015 | Cote et al. |
| 2015/0098014 | A1 | 4/2015 | Raskar et al. |
| 2015/0229819 | A1 | 8/2015 | Rivard |
| 2016/0148356 | A1 | 5/2016 | Dabral et al. |
| 2016/0259994 | A1 | 9/2016 | Ravindran et al. |
| 2016/0323518 | A1 | 11/2016 | Rivard et al. |
| 2017/0070719 | A1 | 3/2017 | Smolic et al. |
| 2017/0201692 | A1 | 7/2017 | Wu |
| 2017/0302838 | A1 | 10/2017 | Yang et al. |
| 2017/0343887 | A1 | 11/2017 | Hoshino |
| 2018/0025257 | A1 | 1/2018 | van den Oord et al. |
| 2018/0137375 | A1 | 5/2018 | Takemura et al. |
| 2018/0137643 | A1 | 5/2018 | Wang |
| 2018/0192098 | A1 | 7/2018 | Pekkucuksen et al. |
| 2019/0149706 | A1 | 5/2019 | Rivard et al. |
| 2019/0306399 | A1 | 10/2019 | Fujinami et al. |

FOREIGN PATENT DOCUMENTS

| | | |
|---|---|---|
| CN | 106934769 A | 7/2017 |
| CN | 107203985 A | 9/2017 |
| JP | 2007228099 A | 9/2007 |
| JP | 2012119840 A | 6/2012 |
| JP | 2016019196 A | 2/2016 |
| JP | 2018064201 A | 4/2018 |
| JP | 6333095 B2 | 5/2018 |
| KR | 10-2008-0076004 A | 8/2008 |
| KR | 10-2013-0031574 A | 3/2013 |
| KR | 10-2015-0019985 A | 2/2015 |
| KR | 10-1633893 B1 | 6/2016 |
| KR | 20160127606 A | 11/2016 |
| KR | 10-1698876 B1 | 1/2017 |
| KR | 101699919 B1 | 1/2017 |
| KR | 10-2018-0132210 A | 12/2018 |
| KR | 10-2034968 B1 | 10/2019 |
| WO | 2019001701 A1 | 1/2019 |

OTHER PUBLICATIONS

Li et al., "An Improved FAST+SURF Fast Matching Algorithm", Procedia Computer Science 107, International Congress of Information and Communication Technology, 2017, 7 pages.

Li et al., "Multi-exposure high dynamic range image synthesis with camera shake corrections", Proceedings of SPIE, Applied Optics and Photonics China, 2017, 6 pages, Beijing, China.

Swathi, "Satellite Image Co-Registration Based on Hybrid Invariant Local Features", Journal of Theoretical and Applied Information Technology, vol. 95, No. 15, Aug. 2017, 9 pages.

International Search Report and Written Opinion of the International Searching Authority regarding International Patent Application No. PCT/KR2019/014937 dated Feb. 21, 2020, 10 pages.

International Search Report and Written Opinion of the International Searching Authority regarding International Patent Application No. PCT/KR2020/000107 dated Apr. 21, 2020, 8 pages.

Eilertsen et al., "HOR image reconstruction from a single exposure using deep CNNs, Supplementary material", ACM Transactions on Graphics, Nov. 2017, 6 pages.

Marnerides et al., "ExpandNet: A Deep Convolutional Neural Network for High Dynamic Range Expansion from Low Dynamic Range Content", Computer Graphics Forum, vol. 37, No. 2, May 2018, 13 pages.

Kim et al., "Online Video Deblurring via Dynamic Temporal Blending Network", Computer Vision Foundation, Apr. 2017, pp. 4038-4047.

Joshi et al., "Seeing MI. Rainier: Lucky Imaging for Multi-Image Denoising, Sharpening, and Haze Removal", 2010 IEEE International Conference on Computational Photography (ICCP), Mar. 2010, 8 pages.

Kalantari et al. "Deep High Dynamic Range Imaging of Dynamic Scenes", ACM Transactions on Graphics, vol. 36, No. 4, Article 144, Jul. 2017, 12 pages.

Tezcan, "Motion Estimation Using Convolutional Neural Networks", Boston University, Department of Electrical and Computer Engineering, Technical Report No. ECE-2017-04, Dec. 2017, 30 pages.

Gelfand et al., "Multi-exposure Imaging on Mobile Devices", MM'10, Oct. 2010, 4 pages.

Kingma et al., "Adam: A Method for Stochastic Optimization", ICLR 2015, Jan. 2017, 15 pages.

Hasinoff et al., "Burst Photography for High Dynamic Range and Low-Light Imaging on Mobile Cameras", ACM Trans. Graph., vol. 35, No. 6, Article 192, Nov. 2016, 12 pages.

Fischer et al., "FlowNet: Learning Optical Flow with Convolutional Networks", May 2015, 13 pages.

Ilg et al., "FlowNet 2.0: Evolution of Optical Flow Estimation with Deep Networks", University of Freiburg, Germany, Dec. 2016, 16 pages.

Zhen et al., "System and Method for Compositing High Dynamic Range Images", U.S. Appl. No. 16/277,630, filed Feb. 15, 2019, 52 pages.

(56) References Cited

OTHER PUBLICATIONS

Le et al., "Apparatus and Method for Generating Low-Light Images With Improved Bokeh Using Mobile Electronic Device", U.S. Appl. No. 16/278,581, filed Feb. 18, 2019, 52 pages.
International Search Report and Written Opinion of the International Searching Authority in connection with International Patent Application No. PCT/KR2019/008150 dated Nov. 15, 2019, 25 pages.

* cited by examiner (Y CHANNEL, SHORT EXPOSURE – DETAIL LAYER)

(Y CHANNEL, LONG EXPOSURE – DETAIL LAYER)

(Y CHANNEL, SHORT EXPOSURE – BASE LAYER)

(Y CHANNEL, LONG EXPOSURE – BASE LAYER)

(Y CHANNEL, SHORT EXPOSURE)

(Y CHANNEL, LONG EXPOSURE)

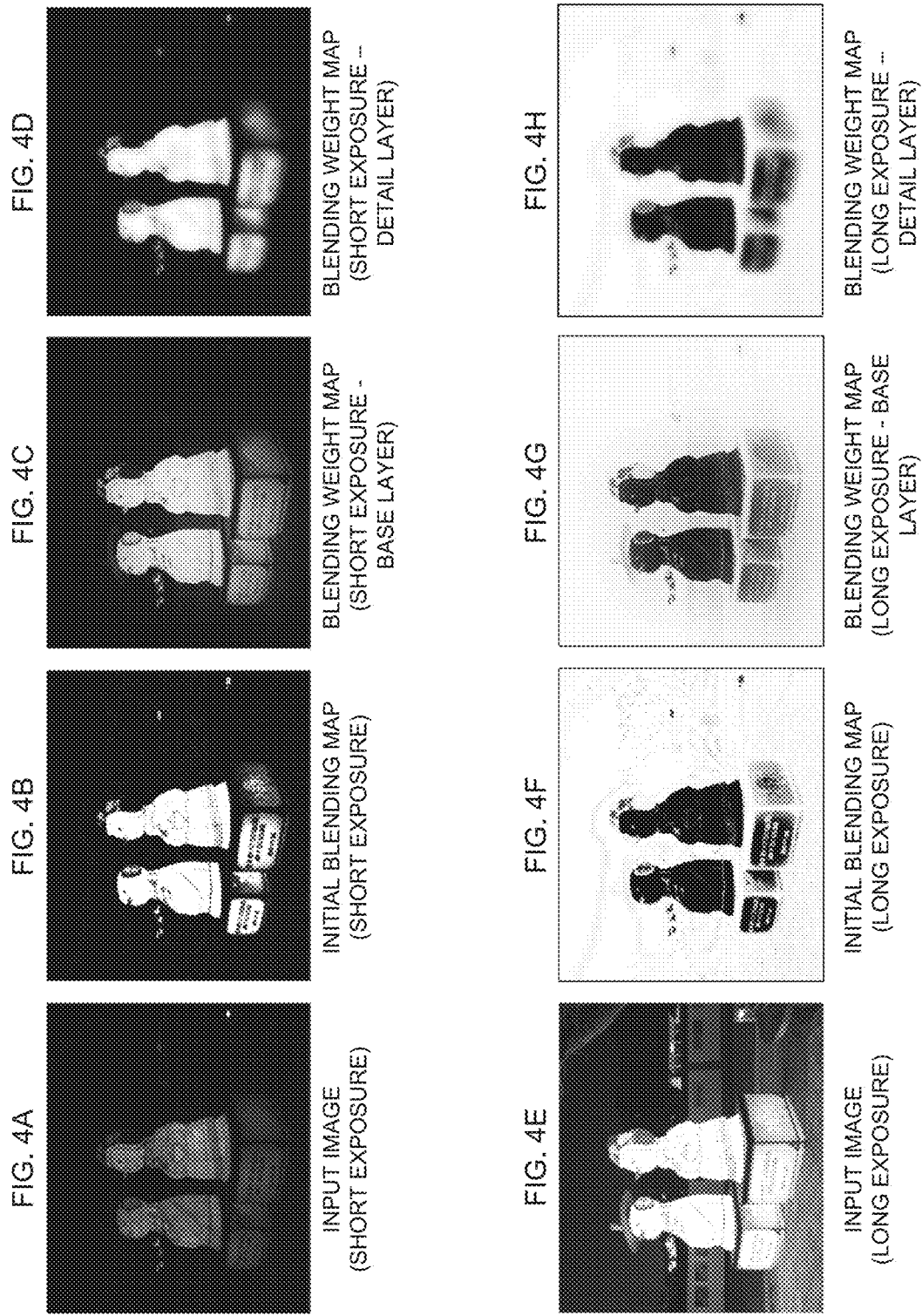

GUIDED MULTI-EXPOSURE IMAGE FUSION

CROSS-REFERENCE TO RELATED APPLICATION AND PRIORITY CLAIM

This application claims priority under 35 U.S.C. § 119(e) to U.S. Provisional Patent Application No. 63/054,160 filed on Jul. 20, 2020, which is hereby incorporated by reference in its entirety.

TECHNICAL FIELD

This disclosure relates generally to imaging systems. More specifically, this disclosure relates to guided multi-exposure image fusion.

BACKGROUND

In photography, the phrase "dynamic range" refers to a ratio of the brightest luminosity that a photographic recording medium can capture relative to a darkest luminosity that the photographic recording medium can capture. The limited dynamic range of photographic recording media, such as photographic film or digital image sensors, relative to the dynamic range of the human eye has challenged photographers and camera builders for over a century. Photographic images (including digital photographs) generally cannot reproduce the same range of bright details and dark details that the human eye can perceive.

High Dynamic Range (HDR) imaging involves generating a single image as a blended composite of multiple images of different exposure values, which offers significant improvements in terms of capturing both brighter and darker image details relative to single exposure techniques. However, certain HDR blending techniques, such as certain pyramid blending techniques, may depend on image size. Also, certain HDR blending techniques may produce spatial inconsistencies around boundaries of brighter and darker image regions. These spatial inconsistencies are commonly known as "halos" along boundaries between brighter and darker image regions and are often readily perceivable to viewers. These spatial inconsistencies can give HDR images an unnatural appearance that differs from how the same scene appears to the human eye, and it is highly undesirable for many applications.

SUMMARY

This disclosure provides systems and methods for guided multi-exposure image fusion.

In a first embodiment, a method includes obtaining, using at least one processor, multiple images of a scene including a first image associated with a first exposure value and a second image associated with a second exposure value. Each image includes image data in each of multiple channels of a color space, and the first exposure value is greater than the second exposure value. The method also includes decomposing, using the at least one processor, each channel of each image into a base layer and a detail layer. The method further includes generating, using the at least one processor and for each image, a blending weight map for the base layer and a blending weight map for the detail layer. In addition, the method includes combining, using the at least one processor, the base layers and the detail layers based on the blending weight maps to obtain a high dynamic range (HDR) image of the scene.

In a second embodiment, an electronic device includes at least one processor and at least one memory. The at least one memory contains instructions that, when executed by the at least one processor, cause the electronic device to obtain multiple images of a scene including a first image associated with a first exposure value and a second image associated with a second exposure value. Each image includes image data in each of multiple channels of a color space, and the first exposure value is greater than the second exposure value. The at least one memory also contains instructions that, when executed by the at least one processor, cause the electronic device to decompose each channel of each image into a base layer and a detail layer. The at least one memory further contains instructions that, when executed by the at least one processor, cause the electronic device to generate, for each image, a blending weight map for the base layer and a blending weight map for the detail layer. In addition, the at least one memory contains instructions that, when executed by the at least one processor, cause the electronic device to combine the base layers and the detail layers based on the blending weight maps to obtain an HDR image of the scene.

In a third embodiment, a non-transitory computer-readable medium includes instructions that, when executed by at least one processor, cause an electronic device to obtain multiple images of a scene including a first image associated with a first exposure value and a second image associated with a second exposure value. Each image includes image data in each of multiple channels of a color space, and the first exposure value is greater than the second exposure value. The medium also includes instructions that, when executed by the at least one processor, cause the electronic device to decompose each channel of each image into a base layer and a detail layer. The medium further includes instructions that, when executed by the at least one processor, cause the electronic device to generate, for each image, a blending weight map for the base layer and a blending weight map for the detail layer. In addition, the medium includes instructions that, when executed by the at least one processor, cause the electronic device to combine the base layers and the detail layers based on the blending weight maps to obtain an HDR image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, in accordance with this disclosure, an electronic device may be one or a combination of the above-listed devices. In accordance with this disclosure, the electronic device may be a flexible electronic device. The electronic device disclosed here is not limited to the above-listed devices and may include any other electronic devices now known or later developed.

In the following description, electronic devices are described with reference to the accompanying drawings, in accordance with this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIGS. 4A, 4B, 4C, 4D, 4E, 4F, 4G, and 4H illustrate example initial blending maps and blending weight maps for base and detail layers in accordance with this disclosure;

DETAILED DESCRIPTION

FIGS. 1 through 7B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
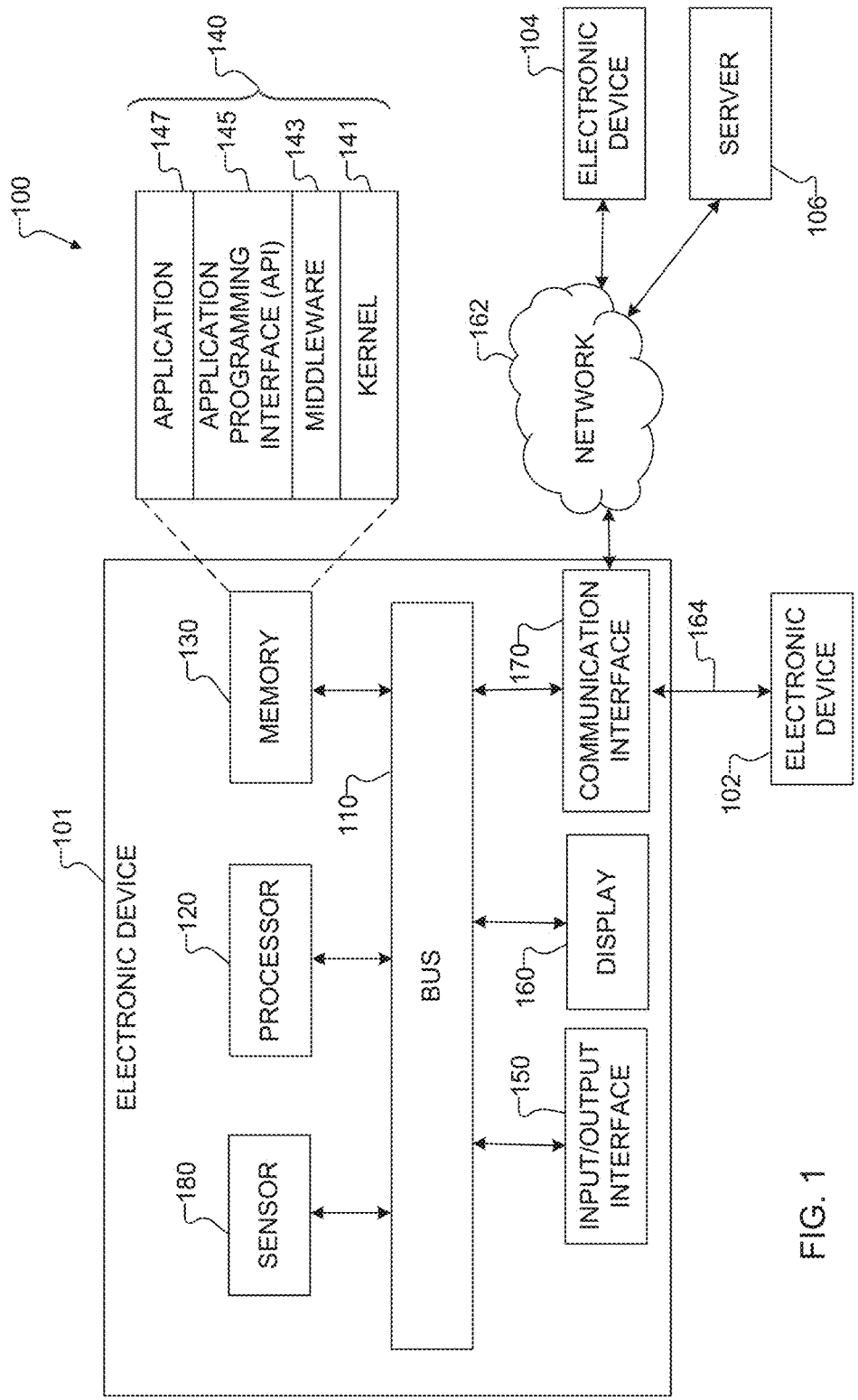
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process image frames and generate High Dynamic Range (HDR) images using guided multi-exposure image fusion as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process image frames and generate HDR images using guided multi-exposure image fusion as described in more detail below. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 includes one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. In some embodiments of this disclosure, the server 106 includes a group of one or more servers. Also, in some embodiments of this disclosure, all or some of the operations executed on the electronic device 101 can be executed on another or multiple other electronic devices (such as the electronic devices 102 and 104 or server 106). Further, in some embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function in some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process image frames and generate HDR images using guided multi-exposure image fusion as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
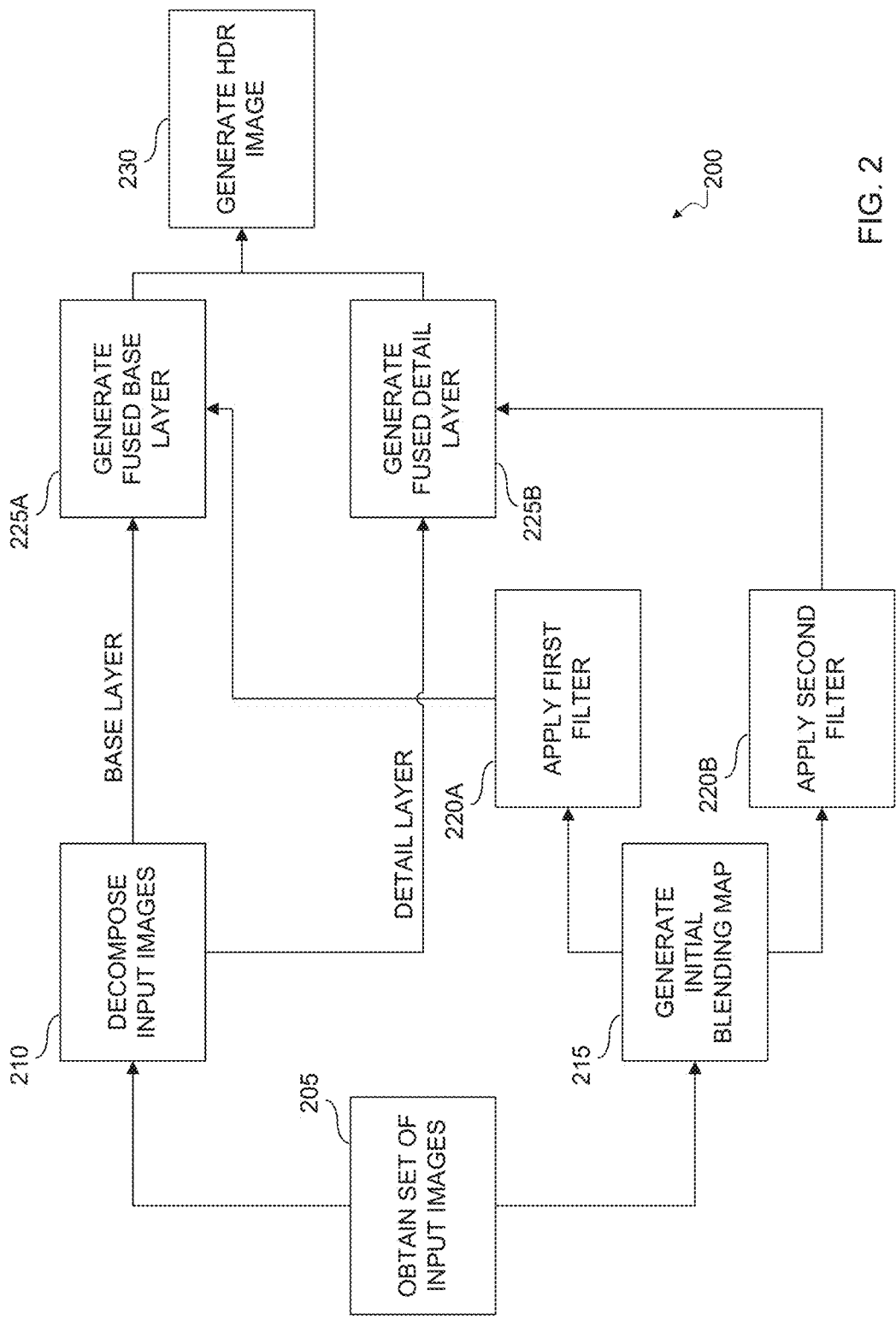
FIG. 2 illustrates an example technique for providing guided multi-exposure image fusion in accordance with this disclosure.

FIG. 2 illustrates an example technique 200 for providing guided multi-exposure image fusion in accordance with this disclosure. For ease of explanation, the technique 200 of FIG. 2 may be described as being used by the electronic device 101 of FIG. 1. However, the technique 200 may be used with any suitable device(s) and in any suitable system(s), such as when the technique 200 is used with the server 106 in FIG. 1 or in another system.

As shown in FIG. 2, a set of input images of a scene is obtained at operation 205. The input images represent multiple digital images of the scene, which may be captured using one or more cameras or other imaging sensors 180 of the electronic device 101. At least some of the input images are captured using different exposure values. In some embodiments, the different exposure values are obtained by varying the exposure times used to capture different images of the scene. In this way, different ones of the input images capture different details of the scene. For instance, a larger-exposure image (such as an image taken with a longer exposure time or slower shutter speed) can capture details in darker (low-key) portions of the scene that would appear invisible or grainy at smaller exposure values. A smaller-exposure image (such as an image taken with a shorter exposure time or faster shutter speed) can capture details in brighter (high-key) portions of the scene that would appear blown out at higher exposure values. The phrase "blown out" here encompasses conditions where light provided by a portion of a scene exceeds the upper limit of the dynamic range of an imaging sensor 180, resulting in significant or total loss of color saturation.

Each of the input images obtained during operation 205 includes image data in each of multiple channels of a color space. One example of a color space and its constituent channels that may be used for the input images received at operation 205 is the "YCbCr" color space, where each pixel of an image is expressed as a luminance (Y) channel value, a blue-difference chrominance (Cb) channel value, and a red-difference chrominance (Cr) channel value. Other examples of color spaces that may be used for the input images received at operation 205 include the "RGB" (red-green-blue) color space, the "CMYK" (cyan-yellow-magenta-key) color space, and a Bayer color space (such as an BGGR, RBGB, GRGB, or RGGB color space).

For each channel of each input image, the image data of the channel is decomposed into a base layer and a detail layer at operation 210. In some embodiments, the image data of each channel can be represented as the superposition or sum of a base layer and a detail layer. As used in this disclosure, the phrase "base layer" refers to an image layer that includes large-scale variations in values of a channel of image data, and the phrase "detail layer" refers to an image layer that includes small-scale (relative to the base layer) variations in values of a channel of image data.

As a particular example, the image data forming the luminance (Y) channel of an image i may be expressed as follows:

$$Y_i = YD_i + YB_i \quad (1)$$

As shown here, $Y_i$ represents the sum of the detail layer $YD_i$ and the base layer $YB_i$. Thus, the detail layer $YD_i$ can be obtained by subtracting the base layer $YB_i$ from the original $Y_i$ channel image data as follows:

$$YD_i = Y_i - YB_i \quad (2)$$

In some embodiments, the base layer for each channel can be obtained by applying a box filter (such as boxfilt or imboxfilt in MATLAB) to the image data of each channel. For example, the base layer $YB_i$ of the Y channel of image i might be obtained as follows:

$$YB_i = \text{boxfilt}(Y_i, \theta) \quad (3)$$

where θ is a parameter setting the size or kernel of the box filter. The value of θ can be tuned to optimize the quality of images produced by the technique 200. From this, the detail layer $YD_i$ can be obtained by subtracting the base layer $YB_i$ from $Y_i$. Depending on the implementation, the base and detail layers of each channel of each input image can be obtained using the same process described above with reference to the luminance channel $Y_i$ of image i.

For each input image, an initial blending map is generated at operation 215. In some embodiments, each initial blending map includes, for one of the input images, an initial determination of the weight to be given to each pixel of the image when blending the images to form an HDR image. For example, consider an input image i associated with a low exposure (such as short exposure time). All other things being equal, the image details in any low-key regions of input image i are likely to be poor or nonexistent due to the short exposure time, while the image details in any high-key regions of input image i are more likely to exhibit good color saturation and not be blown out. Accordingly, an initial blending map for image i might assign higher weights to high-key regions of image i than to low-key regions of image i. In this way, the contribution of the best-exposed portions of image i to the final HDR composite of the input images would be greater than the contribution of the poorly-exposed portions of image i.

In some embodiments, each initial blending map generated at operation 215 includes, for each input image i, a composite of (i) a first map of values of a contrast or saliency metric C and (ii) a second map of values of a color saturation metric S. In this example, the values of C correspond to the extent to which a given region of an input image i exhibits sufficient contrast from which edge details can be perceived. Also, in this example, the values of S correspond to the color saturation, such as whether the colors in a particular area appear deep or "blown out" and almost white. In particular embodiments, the first map $C_i$ of the saliency metric C for an input image i can be obtained as follows:

$$C_i = (Y_i * L) * G \quad (4)$$

where $Y_i$ is the luminance channel of the image data for image i, L is a Laplacian operator, and G is a Gaussian filter. Also, in particular embodiments where the image data for the input image i is provided through the channels of the YCbCr color space, the second map $S_i$ of the color saturation metric S for the input image i can be obtained as follows:

$$S_i = (Cb_i - 128)^2 + (Cr_i - 128)^2 \quad (5)$$

In some cases, an initial blending map $P_i$ for the input image i is generated by combining and normalizing the first and second maps, which may occur as follows:

$$\tilde{P}_i = C_i * S_i \quad (6)$$

$$P_i = \frac{\tilde{P}_i}{\sum_{i=1}^{N} \tilde{P}_i} \quad (7)$$

These operations may be repeated for each input image so that an initial blending map P is generated for each input image. In this way, $P_i$ assigns channel-agnostic initial blending weights that can be refined to properly register with object boundaries within the scene.

In many cases, the initial blending maps $P_i$ generated at operation 215 are noisy, and the transitions in blending weights are spatially inconsistent relative to the boundaries of objects in the scene. In practical terms, if HDR images are formed by blending input images based upon the initial blending maps, the weighting values for a given image or layer may not register precisely with object boundaries, producing regions of improper exposures around the boundaries between high-key and low-key areas of the image. Left uncorrected, these registration errors can appear in the final HDR images as light halos (where the high weighting given to a high-exposure image to bring out detail in a low-key region spills over to a high-key region) or dark halos (where the high weighting given to a low-exposure image to preserve detail in a high-key region spills over to a low-key region).

In FIG. 2, registration errors in the initial blending maps that give rise to halos and other spatial inconsistencies within HDR images can be significantly reduced or eliminated by applying one or more filters (such as one or more guided filters) to the initial blending maps. Thus, a first filter can be applied to each of the initial blending maps at operation 220A to generate blending weight maps for the base layer of each input image, and/or a second filter can be applied to each of the initial blending maps at operation 220B to generate blending weight maps for the detail layer of each input image. In some embodiments, for each of the blending maps $P_i$ generated at operation 215, the alignment of blending weights relative to object boundaries can be enhanced by applying one or more guided filters operating as one or more edge-preserving filters, where each guided filter has a specified kernel size governing the size of the image area processed by the guided filter. In some cases, the first filter may represent a guided filter with a kernel of a first size (such as 25×25) that is applied to each initial blending map $P_i$ to obtain, for each input image i, a blending weight map $WB_i$ for the base layer. In some embodiments, the data $Y_i$ of the luminance channel of the input image i is used as the guiding image for the first filter. Also, in some cases, the second filter may represent a guided filter with a kernel of a smaller second size (such as 5×5) and lower blur degree relative to the first filter that is applied to each initial blending map $P_i$ to obtain, for each input image i, a blending weight map $WD_i$ for the detail layer.

In particular embodiments, the filtering applied during operation 220A can be represented as follows:

$$\widetilde{WB}_i = G_{r_1,\epsilon_1}(P_i, Y_i) \quad (8)$$

$$WB_i = \frac{\widetilde{WB}_i}{\sum_{i=1}^{N} \widetilde{WB}_i} \quad (9)$$

where $G_{r,\epsilon}$ denotes the guided filtering operation, and r and ε are the parameters that decide the kernel size of the filter and blur degree of the guided filter. As shown above, the blending weight map $\widetilde{WB}_i$ for the base layer of the input image i is determined in Equation (8) and subsequently normalized in Equation (9) to account for the N number of input images. Also, in particular embodiments, the filtering applied during operation 220B can be represented as follows:

$$\widetilde{WD}_i = G_{r_2,\epsilon_2}(P_i, Y_i) \quad (10)$$

$$WD_i = \frac{\widetilde{WD}_i}{\sum_{i=1}^{N} \widetilde{WD}_i} \quad (11)$$

By applying different filter parameters to obtain the blending weight maps for the base and the detail layers, smoother-edged blending weight maps for the base layer (where the blending weights for the base closely follow object boundaries) can be obtained. At the same time, the blending weight maps for the detail layer can preserve detail. In some embodiments, to help preserve color saturation details, blending weights of the base layer in images with a short exposure time (such as those images least likely to be blown out) can be enhanced.

In some embodiments, the process of reconstituting the decompositions of the channels of the input images is performed in two stages. In a first stage, fused base layers and fused detail layers of the constituent channels of the color space are generated at operations 225A and 225B. In a second stage, the fused base layer and the fused detail layer of each channel are combined to obtain an HDR image at operation 230. In some embodiments, the base layers of the channels for the input images are fused together according to the blending weight map for the base layer generated at operation 225A to obtain fused base layers for the channels. For example, when the input images are in the YCbCr color space, a fused base layer $YB_f$ in the luminance channel, a fused base layer $CbB_f$ in the blue-difference chrominance channel, and a fused base layer $CrB_f$ in the red-difference chrominance channel may be obtained during operation 225A. As another example, a fused detail layer $YD_f$ in the luminance (Y) channel, a fused detail layer $CbD_f$ in the blue-difference chrominance channel, and a fused detail layer $CrB_f$ in the red-difference chrominance channel may be obtained during operation 225B.

In particular embodiments, the fused base layers for the channels of the color space of the input images can be obtained as follows:

$$YB_f = \Sigma_{i=1}^{N} YB_i * WB_i \quad (12)$$

$$CbB_f = \Sigma_{i=1}^{N} CbB_i * ds(WB_i) \quad (13)$$

$$CrB_f = \Sigma_{i=1}^{N} CrB_i * ds(WB_i) \quad (14)$$

As shown above, for the luminance (Y) channel, the fused base layer is determined as a weighted average of each convolution of the luminance channel base layer for each image i and the blending weight map $WB_i$ for the base layer of image i. A similar weighted average can be determined for each of the blue-difference and red-difference chrominance channels, differing only in that a downsampling operator ds can be applied to each blending weight map $WB_i$ to account for the fact that, in some embodiments, the Cb and Cr channels contain half as much data as the luminance channel. Also, in particular embodiments, the fused detail layers for the channels of the input images can be obtained as follows:

$$YD_f = \Sigma_{i=1}^{N} YD_i * WD_i \quad (15)$$

$$CbD_f = \Sigma_{i=1}^{N} CbD_i * ds(WD_i) \quad (16)$$

$$CrD_f = \Sigma_{i=1}^{N} CrD_i * ds(WD_i) \quad (17)$$

Once again, ds is a downsampling operator to compensate for the fact that the chrominance channels may be half the size of the luminance channel.

A final HDR image is generated at operation 230. In some embodiments, the final HDR image is generated by combining, for each of the channels of the color space of the input images, the fused base layers and the fused detail layers generated at operations 225A and 225B. For example, in embodiments where the input images are in the YCbCr color space, the Y channel of the final HDR image can be obtained by combining the fused base layer $YB_f$ with the fused detail layer $YD_f$ as follows:

$$Y_f = YB_f + YD_f \quad (18)$$

Also, in this example, the chrominance channels of the final HDR image can similarly be obtained by combining the fused base layers and the fused detail layers as follows:

$$Cb_f = CbB_f + CbD_f + 128 \quad (19)$$

$$Cr_f = CrB_f + CrD_f + 128 \quad (20)$$

As shown here, in some embodiments, an adjustment constant (128 in this example) may be added to the combined values of the fused base layer and the fused detail layer to account for the differences in data depth between channels of the color space, although other adjustment constants or no adjustment constants may be used.

Note that the operations and functions described above with reference to FIG. 2 can be implemented in an electronic device 101, 102, 104, server 106, or other device in any suitable manner. For example, in some embodiments, the operations and functions described above can be implemented or supported using one or more software applications or other software instructions that are executed by at least one processor 120 of a device. In other embodiments, at least some of the operations and functions described above can be implemented or supported using dedicated hardware components. In general, the operations and functions described above can be performed using any suitable hardware or any suitable combination of hardware and software/firmware instructions.

Although FIG. 2 illustrates one example of a technique 200 for providing guided multi-exposure image fusion, various changes may be made to FIG. 2. For example, the technique 200 shown in FIG. 2 may be used to fuse multiple images with different exposure values to generate HDR images or other types of images. Also, any suitable types of images may be used as the input images here, such as multi-spectral images, multi-flash images, and multi-camera images.

FIGS. 3A, 3B, 3C, 3D, 3E, and 3F illustrate example operations for decomposing input image data into base and detail layers in accordance with this disclosure. More specifically, these figures illustrate how input images that are obtained during operation 205 in FIG. 2 may be decomposed during operation 210 in FIG. 2.

Figure 3C:
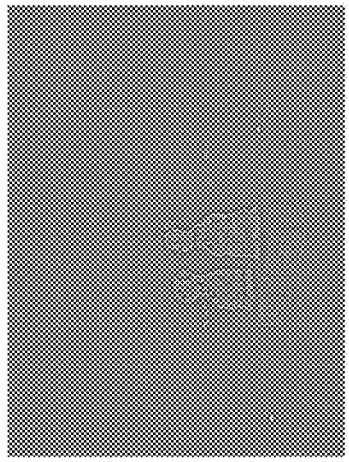
FIGS. 3A, 3B, 3C, 3D, 3E, and 3F illustrate example operations for decomposing input image data into base and detail layers in accordance with this disclosure.
Figure 3F:
Figure 3B:
Figure 3E:
Figure 3A:
Figure 3D:

FIG. 3A illustrates example image data in the Y channel of an image of a scene taken over a shorter exposure, and FIG. 3D illustrates example image data in the Y channel of another image of the same scene taken over a longer exposure. In this example, details in high-key areas of the scene, such as the faces of the inflatable snowmen, are clearly visible in the shorter-exposure image of FIG. 3A but generally blown out in the longer-exposure image of FIG. 3D. By the same token, details in low-key areas of the scene, such as the tree and writing on the wall in the background, are generally invisible in the shorter-exposure image of FIG. 3A but clearly captured in the longer-exposure image of FIG. 3D.

FIG. 3B illustrates an example base layer obtained by decomposing the Y channel data of the shorter-exposure image data shown in FIG. 3A. In some embodiments, the base layer shown in FIG. 3B is obtained by applying a box filter to the Y channel image data of FIG. 3A. As shown in FIG. 3B, the base layer captures the large-scale variations in the Y values across the input image but not the smaller-scale variations in the Y values. In this example, this means that the exterior boundaries of the snowmen are included in the base layer, but the seams and facial details of the snowmen are not in the base layer. FIG. 3E illustrates an example base layer obtained by decomposing the Y channel data of the longer-exposure image data shown in FIG. 3D. As shown in FIG. 3E, large-scale variations in the Y values, such as the forms of the snowmen, the tree, and blocks of black corresponding to writing on the wall in the background, are once again captured in the base layer, but small-scale variations do not appear in the base layer.

FIG. 3C illustrates an example detail layer of a decomposition of the Y channel image data shown in FIG. 3A. In some embodiments, the detail layer shown in FIG. 3C is obtained by subtracting the base layer image data of FIG. 3B from the Y channel image data of FIG. 3A. As shown in FIG. 3E, small-scale details, such as the buttons and seams of the inflatable snowmen, are captured in the detail layer. FIG. 3F illustrates an example detail layer of a decomposition of the Y channel image data shown in FIG. 3D. In some embodiments, the detail layer shown in FIG. 3F is obtained by subtracting the base layer image data of FIG. 3E from the from the Y channel image data of FIG. 3D.

Although FIGS. 3A, 3B, 3C, 3D, 3E, and 3F illustrate examples of operations for decomposing input image data into base and detail layers, various changes may be made to these figures. For example, the contents of the images shown here are for illustration only and can vary widely based on the images being captured and processed. Also, similar operations can occur in each channel of each input image.

FIGS. 4A, 4B, 4C, 4D, 4E, 4F, 4G, and 4H illustrate example initial blending maps and blending weight maps for base and detail layers in accordance with this disclosure. More specifically, these figures illustrate how initial blending maps and blending weight maps may be generated during operations 215, 220A, and 220B in FIG. 2.

FIG. 4A illustrates example image data of a shorter-exposure image of a scene. As with FIG. 3A, the facial and seam details of the illuminated inflatable snowman are captured in the shorter-exposure image, while the tree and background are underexposed to the point of invisibility. FIG. 4E illustrates example image data of a longer-exposure image of a scene. As with FIG. 3D, while the high-key regions of the image such as the illuminated snowmen are blown out and generally white and featureless, details in the low-key areas of the image (such as the tree and background) have been captured in the image.

FIG. 4B provides an example of an initial blending map, such as an initial blending map generated at operation 215 of FIG. 2. In this example, regions of the input image shown in FIG. 4A to which highest initial weighting values have been assigned are shown in white, and regions of the input image to which the lowest weighting values have been assigned are shown in black. Regions of the input image to which intermediate initial weighting values have been assigned are shown in corresponding shades of grey. Similarly, FIG. 4F provides an example of an initial blending map, such as another initial blending map generated at operation 215, for the longer-exposure image shown in FIG. 4E.

FIG. 4C provides an example of a blending weight map for the base layer of the shorter-exposure input image, such as one generated by applying a first (larger kernel) guided filter or other filter in operation 220A of FIG. 2 to the initial blending weight map shown in FIG. 4B. In some embodiments, data from the Y channel of the input image shown in FIG. 4A is used as a guide image for the first filter. As shown in FIG. 4C, application of the first filter sharpens the boundaries of objects in the blending map relative to the edges shown in FIG. 4B, thereby reducing the incidence of spatial inconsistencies and overshoots that can give rise to halo effects or other visual artifacts. FIG. 4G provides an example of a blending weight map for the base layer of the longer-exposure input image, such as one generated by applying the first (large kernel) guided filter or other filter in operation 220A of FIG. 2 to the initial blending weight map shown in FIG. 4F. As with FIG. 4C, application of the first filter refines and sharpens edges within the base layer in FIG. 4G relative to the initial blending map shown in FIG. 4F. Again, refinement of the edges within the blending weight map for the base layer to the objects in the scene reduces the incidence of spatial inconsistencies and overshoots that can give rise to halo effects or other visual artifacts.

FIG. 4D illustrates an example of a blending weight map for the detail layer of the shorter-exposure input image, such as one generated by applying a second guided filter or other filter in operation 220B of FIG. 2 to the initial blending weight map shown in FIG. 4B. In some embodiments, the second filter uses a smaller kernel and different blending values than the first filter. Also, in some embodiments, the second filter uses image data in the Y channel of the input image as a guide image. As shown in FIG. 4D, the second filter "buffs out" inconsistencies within the weighting of the shorter-exposure image in regions where the shorter-exposure image has a high weighting value. In this way, the details that are well-captured by the shorter-exposure image (such as details within high-key regions of the image, like the snowmen's bodies) are consistently weighted within the final HDR image. This also helps to reduce the incidence of spatial inconsistencies and overshoots that can give rise to halo effects or other visual artifacts caused by inconsistencies or other issues in the underlying blending maps.

FIG. 4H illustrates an example of a blending weight map for the detail layer for the longer-exposure input image, such as one generated by applying a second guided filter or other filter in operation 220B of FIG. 2 to the initial blending weight map shown in FIG. 4F. In some embodiments, the second filter uses a smaller kernel and different blending values than the first filter. Also, in some embodiments, the second filter uses image data in the Y channel of the input image as a guide image. As shown in FIG. 4H, application of the second filter refines the initial blending map by smoothing out local inconsistencies in the initial blending map. For example, the initial blending map shown in FIG. 4F includes some isolated regions with high weighting values (which appear in white or light grey in FIG. 4F) assigned to blown-out high-key regions (such as the snowmen's bodies). Through application of the second filter, these local inconsistencies are smoothed out in the blending weight map for the detail layer shown in FIG. 4H.

Although FIGS. 4A, 4B, 4C, 4D, 4E, 4F, 4G, and 4H illustrate examples of initial blending maps and blending weight maps for base and detail layers, various changes may be made to these figures. For example, the contents of the images shown here are for illustration only and can vary widely based on the images being captured and processed. Also, similar operations can occur in each channel of each input image.

Figure 5:
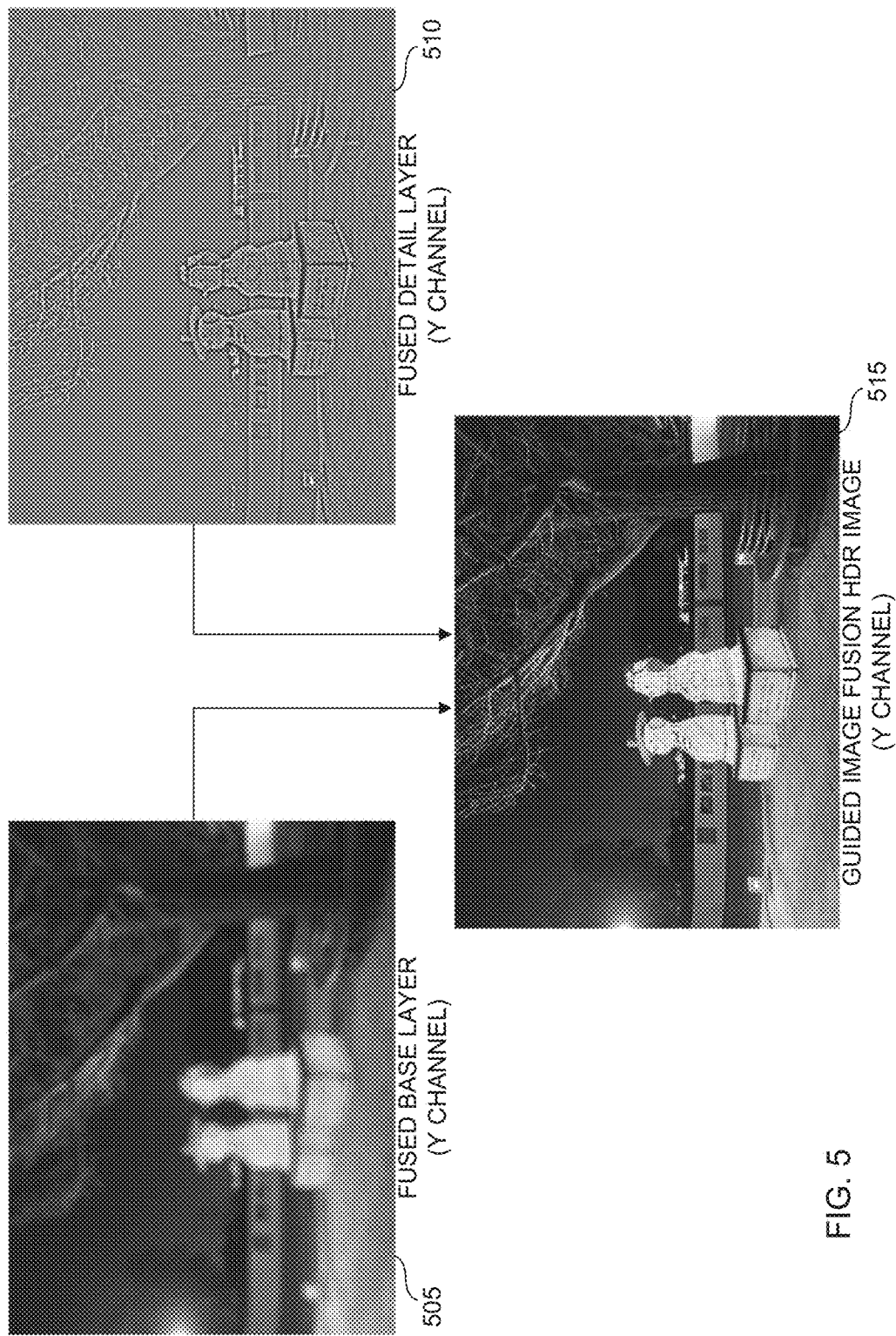
FIG. 5 illustrates an example combination of a fused base layer and a fused detail layer to obtain a channel of an HDR image in accordance with this disclosure.

FIG. 5 illustrates an example combination of a fused base layer and a fused detail layer to obtain a channel of an HDR image in accordance with this disclosure. More specifically, this figure illustrates how fused base and detail layers (such as those obtained at steps 225A and 225B in FIG. 2) for a given channel may be combined during operation 230 in FIG. 2.

As shown in FIG. 5, an image 505 of fused Y channel base layer data for multiple input images is shown. In some embodiments, the fused image 505 is generated by combining the Y channel base layers for the input images, where the Y channel base layer of each image contributes to the fused base layer for the Y channel according to weights specified by the blending weight map for the base layer of the image. Also, as shown in FIG. 5, an image 510 of fused Y channel detail layer data for multiple input images is shown. In some embodiments, the fused image 510 is generated by combining the Y channel detail layers for the input images, where each Y channel detail layer of each image contributes to the fused detail layer according to weights specified by the blending weight map for the detail layer of the image.

An image 515 in FIG. 5 represents a combination of the fused base layer data shown in image 505 and the fused detail layer data shown in image 510. As can be seen in FIG. 5, both high-key and low-key regions of the image 515 include clear detail. This can be seen, for example, by the way that the horizontal members of the back of the bench ringing the tree are bright enough to be seen while, at the same time, the inflatable snowmen are not blown out and their details are visible. Further, there are no dark or light halos along the boundaries between high-key and low-key areas of the image.

Although FIG. 5 illustrates one example of a combination of a fused base layer and a fused detail layer to obtain a channel of an HDR image, various changes may be made to FIG. 5. For example, the contents of the images shown here are for illustration only and can vary widely based on the images being captured and processed. Also, similar operations can occur in each channel of each input image.

Figure 6:
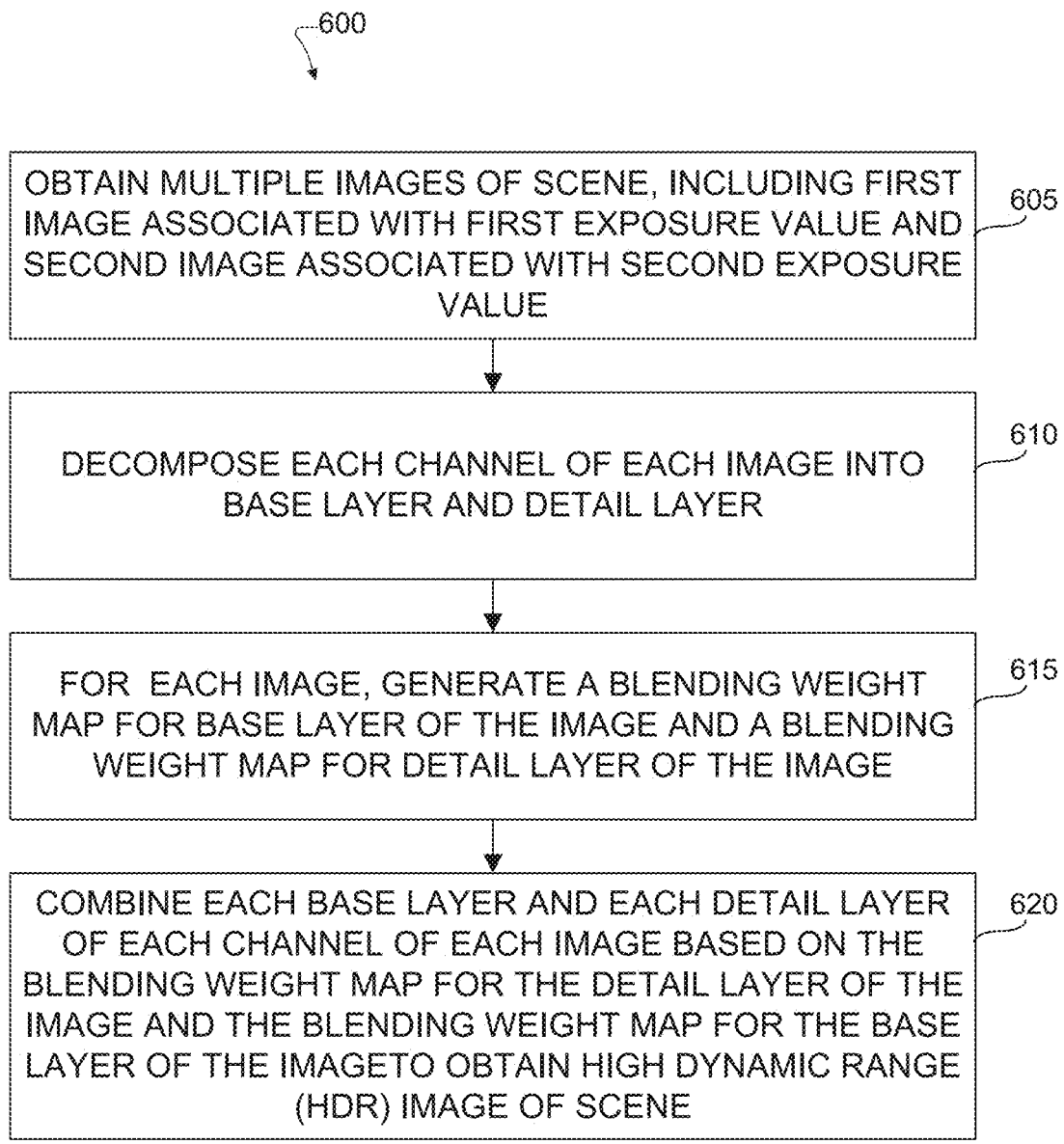
FIG. 6 illustrates an example method for performing guided multi-exposure image fusion in accordance with this disclosure.

FIG. 6 illustrates an example method 600 for performing guided multi-exposure image fusion in accordance with this disclosure. For ease of explanation, the method 600 of FIG. 6 may be described as being performed by the electronic device 101 of FIG. 1. However, the method 600 may be performed with any suitable device(s) and in any suitable system(s), such as when the method 600 is performed by the server 106 in FIG. 1 or in another system.

As shown in FIG. 6, a processor of an electronic device (such as the processor 120 of the electronic device 101) obtains multiple input image of a scene at step 605. The input images of the scene include a first image associated with a first exposure value and a second image associated with a second exposure value. Each image includes image data in multiple channels of a color space (such as the RGB or YCbCr color space), and the first exposure value is greater than the second exposure value. The processor decomposes each channel of each input image into a base layer and a detail layer at step 610. In some embodiments, the decomposition of each channel of each input image is performed by applying a box filter or other function to the image data in each channel.

The processor generates, for each image, a blending weight map for the base layer of the image and a blending weight map for the detail layer of the image at step 615. In some embodiments, the blending weight map for the base layer of the image is generated using a first filter with a first kernel size, and the blending weight map for the detail layer of the image is generated by using a second filter with a second kernel size, where the second kernel size is smaller than the first. Also, in some embodiments, the guiding image for the first and second filters is the image data in the Y channel for each input image. Additionally, in some embodiments, the blending weights for blending weight maps in the base layers are enhanced relative to those of the blending weight maps for the detail layers in order to preserve color saturation details.

The processor combines each base layer and each detail layer of each channel of each image according to the blending weight map for the base layer of the image and the blending weight map for the detail layer of the image to obtain an HDR image of the scene at step 620. In some embodiments, the base and detail layers are combined for each channel of the color space of the HDR image to produce a fused base layer and a fused detail layer for each channel, and the fused base layer and the fused detail layer for each channel are subsequently combined to produce final image data for one channel of the HDR image. This can be done for each channel of the image data to produce the final HDR image.

Although FIG. 6 illustrates one example of a method 600 for performing guided multi-exposure image fusion, various changes may be made to FIG. 6. For example, while shown as a series of steps, various steps in FIG. 6 may overlap, occur in parallel, occur in a different order, or occur any number of times.

Figure 7A:
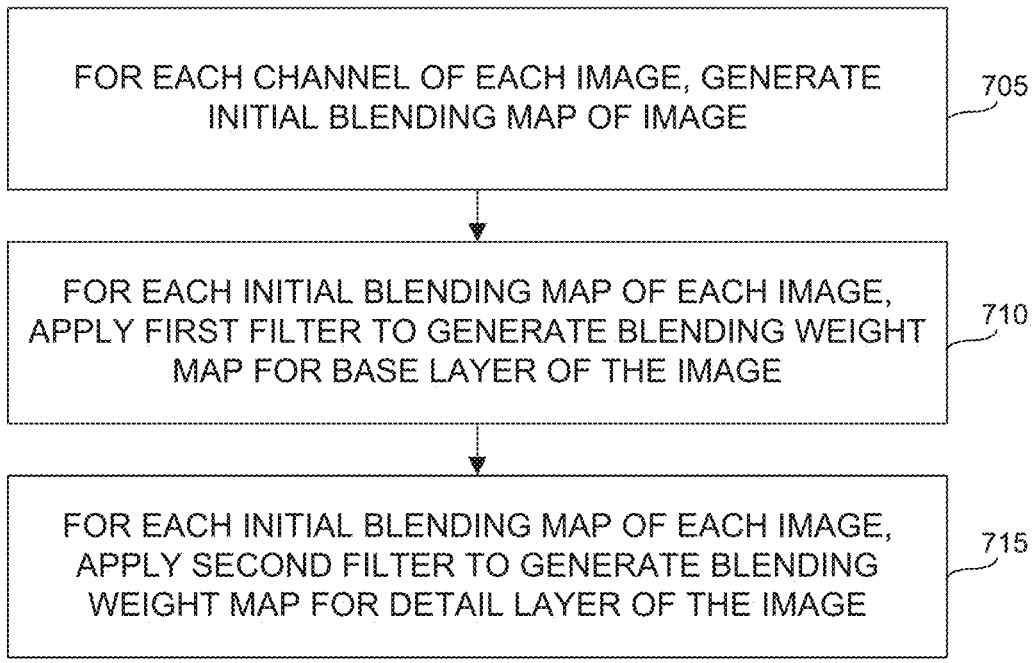
FIGS. 7A and 7B illustrate example methods for supporting guided multi-exposure image fusion in accordance with this disclosure.
Figure 7B:
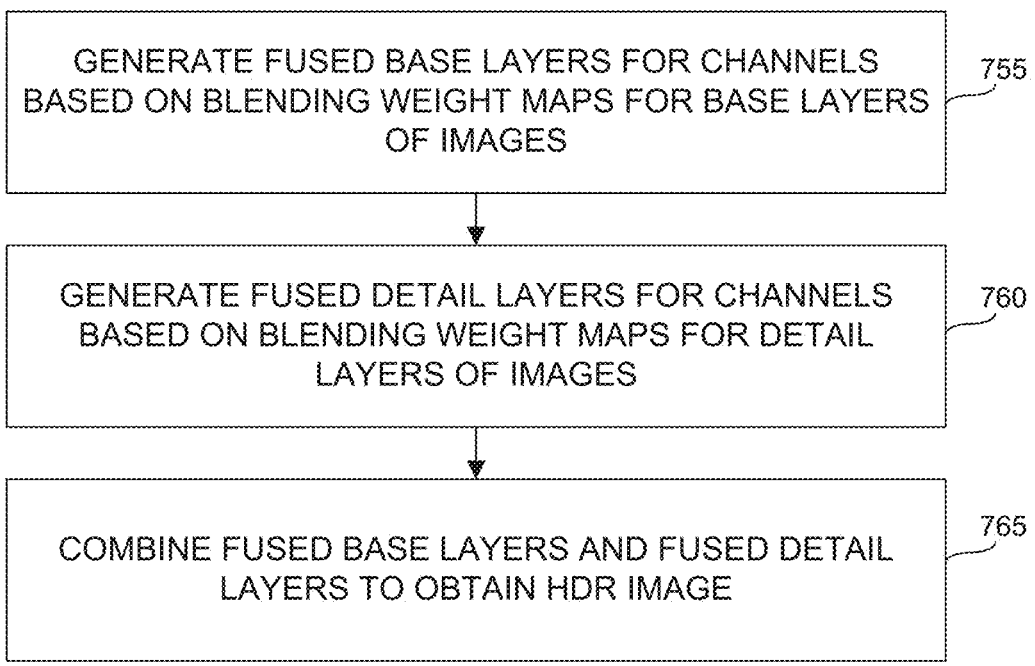

FIGS. 7A and 7B illustrate example methods 700 and 750 for supporting guided multi-exposure image fusion in accordance with this disclosure. More specifically, FIG. 7A illustrates an example method 700 for generating blending weight maps, and FIG. 7B illustrates an example method 750 for generating an HDR image. For ease of explanation, the methods 700 and 750 of FIGS. 7A and 7B may be described as being performed by the electronic device 101 of FIG. 1. However, the methods 700 and 750 may be performed with any suitable device(s) and in any suitable system(s), such as when the methods 700 and 750 are performed by the server 106 in FIG. 1 or in another system.

As shown in FIG. 7A, the processor generates an initial blending map for each obtained input image at step 705. In some embodiments, each initial blending map is generated as a composite of a saliency map for the image and a color saturation map for the image. For each initial blending map of each image, a first filter (such as a first guided filter) is applied to generate a blending weight map for the base layer of that image at step 710. In some embodiments, the first filter is associated with a first (comparatively large) kernel size and a (comparatively) high degree of blur. For each initial blending map of each image, a second filter (such as a second guided filter) is applied to generate a blending weight map for the detail layer of that image at step 715. In some embodiments, the second filter is associated with a second (comparatively small) kernel size and a (comparatively) low degree of blur.

As shown in FIG. 7B, the processor generates a fused base layer for each channel of the color space of the input images at step 755. In some embodiments, the fused base layer for each channel can be obtained as a weighted average of the convolution of the base layer of each image and the blending weight map for the base layer for each image. The processor generates a fused detail layer for each channel of the color space of the input images at step 760. In some embodiments, the fused detail layer for each channel can be obtained as a weighted average of the convolution of the detail layer of each image and the blending weight map for the detail layer for each image. The fused base layer and the fused detail layer for each channel are combined to form an HDR image at step 765.

Although FIGS. 7A and 7B illustrate examples of methods 700 and 750 for supporting guided multi-exposure image fusion, various changes may be made to FIGS. 7A and 7B. For example, while shown as a series of steps in each figure, various steps in each figure may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor, multiple images of a scene including a first image associated with a first exposure value and a second image associated with a second exposure value, each image comprising image data in each of multiple channels of a color space, the first exposure value greater than the second exposure value;
   decomposing, using the at least one processor, each channel of each image into a base layer and a detail layer;
   generating, using the at least one processor, an initial blending map of each image;
   generating, using the at least one processor and for each image, a blending weight map for the base layer and a blending weight map for the detail layer based on the initial blending map of the image; and
   combining, using the at least one processor, the base layers and the detail layers based on the blending weight maps to obtain a high dynamic range (HDR) image of the scene.

2. The method of claim 1, wherein generating, for each image, the blending weight map for the base layer and the blending weight map for the detail layer comprises:
   applying a first filter to the initial blending map of the image in order to generate the blending weight map for the base layer; and
   applying a second filter to the initial blending map of the image in order to generate the blending weight map for the detail layer.

3. The method of claim 2, wherein at least one of the first and second filters comprises a guided filter.

4. The method of claim 2, wherein:
   the first filter comprises a first guided filter with a first kernel size;
   the second filter comprises a second guided filter with a second kernel size; and
   the first kernel size is greater than the second kernel size.

5. The method of claim 2, wherein the first filter is guided by image data in a luminance (Y) channel.

6. The method of claim 1, wherein combining the base layers and the detail layers comprises:
   generating a fused base layer for each channel of the color space based on the blending weight maps for the base layers of the images;
   generating a fused detail layer for each channel of the color space based on the blending weight maps for the detail layers of the images; and
   combining the fused base layers and the fused detail layers for each channel of the color space to obtain the HDR image.

7. The method of claim 1, further comprising:
   preserving saturation details by enhancing blending weights of the base layer of the second image.

8. An electronic device comprising:
at least one processor; and
at least one memory containing instructions that, when executed by the at least one processor, cause the electronic device to:
obtain multiple images of a scene including a first image associated with a first exposure value and a second image associated with a second exposure value, each image comprising image data in each of multiple channels of a color space, the first exposure value greater than the second exposure value;
decompose each channel of each image into a base layer and a detail layer;
generate an initial blending map of each image;
generate, for each image, a blending weight map for the base layer and a blending weight map for the detail layer based on the initial blending map of the image; and
combine the base layers and the detail layers based on the blending weight maps to obtain a high dynamic range (HDR) image of the scene.

9. The electronic device of claim 8, wherein the instructions that when executed cause the electronic device to generate, for each image, the blending weight map for the base layer and the blending weight map of the detail layer comprise:
instructions that, when executed by the at least one processor, cause the electronic device to:
apply a first filter to the initial blending map of the image in order to generate the blending weight map for the base layer; and
apply a second filter to the initial blending map of the image in order to generate the blending weight map for the detail layer.

10. The electronic device of claim 9, wherein at least one of the first and second filters comprises a guided filter.

11. The electronic device of claim 9, wherein:
the first filter comprises a first guided filter with a first kernel size;
the second filter comprises a second guided filter with a second kernel size; and
the first kernel size is greater than the second kernel size.

12. The electronic device of claim 9, wherein the first filter is guided by image data in a luminance (Y) channel.

13. The electronic device of claim 8, wherein the instructions that when executed cause the electronic device to combine the base layers and the detail layers comprise:
instructions that, when executed by the at least one processor, cause the electronic device to:
generate a fused base layer for each channel of the color space based on the blending weight maps for the base layers of the images;
generate a fused detail layer for each channel of the color space based on the blending weight maps for the detail layers of the images; and
combine the fused base layers and the fused detail layers for each channel of the color space to obtain the HDR image.

14. The electronic device of claim 8, wherein the at least one memory further contains instructions that, when executed by the at least one processor, cause the electronic device to preserve saturation details by enhancing blending weights of the base layer of the second image.

15. A non-transitory computer-readable medium containing instructions that, when executed by at least one processor, cause an electronic device to:
obtain multiple images of a scene including a first image associated with a first exposure value and a second image associated with a second exposure value, each image comprising image data in each of multiple channels of a color space, the first exposure value greater than the second exposure value;
decompose each channel of each image into a base layer and a detail layer;
generate an initial blending map of each image;
generate, for each image, a blending weight map for the base layer and a blending weight map for the detail layer based on the initial blending map of the image; and
combine the base layers and the detail layers based on the blending weight maps to obtain a high dynamic range (HDR) image of the scene.

16. The non-transitory computer-readable medium of claim 15, wherein the instructions that when executed cause the electronic device to generate, for each image, the blending weight map for the base layer and the blending weight map for the detail layer comprise:
instructions that, when executed by the at least one processor, cause the electronic device to:
apply a first filter to the initial blending map of the image in order to generate the blending weight map for the base layer; and
apply a second filter to the initial blending map of the image in order to generate the blending weight map for the detail layer.

17. The non-transitory computer-readable medium of claim 16, wherein at least one of the first and second filters comprises a guided filter.

18. The non-transitory computer medium of claim 16, wherein:
the first filter comprises a first guided filter with a first kernel size;
the second filter comprises a second guided filter with a second kernel size; and
the first kernel size is greater than the second kernel size.

19. The non-transitory computer-readable medium of claim 15, wherein the instructions that when executed cause the electronic device to combine the base layers and the detail layers comprise:
instructions that, when executed by the at least one processor, cause the electronic device to:
generate a fused base layer for each channel of the color space based on the blending weight maps for the base layers of the images;
generate a fused detail layer for each channel of the color space based on the blending weight maps for the detail layers of the images; and
combine the fused base layers and the fused detail layers for each channel of the color space to obtain the HDR image.

20. The non-transitory computer-readable medium of claim 15, further containing instructions that, when executed by the at least one processor, cause the electronic device to preserve saturation details by enhancing blending weights of the base layer of the second image.

* * * * *